United States Patent
Legde et al.

(10) Patent No.: US 9,827,946 B2
(45) Date of Patent: Nov. 28, 2017

(54) BELT BUCKLE HAVING A FASTENING DEVICE FOR A CABLE

(71) Applicant: Autoliv Development AB, Vårgårda (SE)

(72) Inventors: Dietmar Legde, Hamburg (DE); Ole Scharnberg, Hamburg (DE); Michel Hermann, Ludwigslust (DE)

(73) Assignee: AUTOLIV DEVELOPMENT AB, Vargarda (SE)

(*) Notice: Subject to any disclaimer, the term of this patent is extended or adjusted under 35 U.S.C. 154(b) by 0 days.

(21) Appl. No.: 15/120,325

(22) PCT Filed: Feb. 25, 2015

(86) PCT No.: PCT/EP2015/053885
§ 371 (c)(1),
(2) Date: Aug. 19, 2016

(87) PCT Pub. No.: WO2015/128345
PCT Pub. Date: Sep. 3, 2015

(65) Prior Publication Data
US 2017/0080895 A1    Mar. 23, 2017

(30) Foreign Application Priority Data
Feb. 27, 2014  (DE) .................. 10 2014 102 568

(51) Int. Cl.
*B60R 22/18* (2006.01)
*A44B 11/25* (2006.01)

(52) U.S. Cl.
CPC .......... *B60R 22/18* (2013.01); *A44B 11/2523* (2013.01); *A44B 11/2553* (2013.01); *A44B 11/2561* (2013.01); *B60R 2022/1806* (2013.01)

(58) Field of Classification Search
CPC ............... Y10T 24/3991; B60R 22/18; B60R 2022/1806; A44B 11/2561; A44B 11/2523; A44B 11/2553
(Continued)

(56) References Cited

U.S. PATENT DOCUMENTS 2,806,215 A   9/1957  Redslob
2,815,497 A   12/1957 Redslob
(Continued)

FOREIGN PATENT DOCUMENTS

DE          42 14 600 A1    11/1992
DE   10 2008 022 675 B3     8/2009
(Continued)

OTHER PUBLICATIONS

PCT International Search Report—dated Mar. 10, 2015.

*Primary Examiner* — Abigail Troy
(74) *Attorney, Agent, or Firm* — Brinks Gilson & Lione

(57) ABSTRACT

Belt buckle (I) for a seat belt system. A cable (6) fastens the belt buckle (1) to a vehicle by a fastening device (7) riveted to the buckle housing (3). The fastening device (7) having a plate-like base (8) from the base surface (9) with a contact projection (11) having a radial arcuate contact surface (12) for a loop (13) formed by the cable (6) protrudes. A pin (14) protrudes from the contact projection (11) which is offset eccentrically in relation to a vertex (15) of the arcuate contact surface (12) of the contact projection (11) around which the cable (6) wraps. A distance (16) of the vertex (15) of the contact surface (12) to a center (17) of the pin (14) is smaller than a radius of curvature (18) of the contact surface (12) at the vertex (15).

9 Claims, 4 Drawing Sheets

(58) Field of Classification Search
USPC .............. 280/801.1, 801.2; 24/115 A, 115 H,
24/115 R, 136 K, 129 R, 130; 297/483
See application file for complete search history.

(56) References Cited

U.S. PATENT DOCUMENTS

| | | | |
|---|---|---|---|
| RE24,510 E | | 8/1958 | Macy |
| 3,427,694 A | | 2/1969 | Bullock |
| 3,806,999 A | | 4/1974 | Fieni |
| 4,199,190 A | * | 4/1980 | Lindblad ............ A44B 11/2546 |
| | | | 24/323 |
| 4,454,634 A | | 6/1984 | Haglund et al. |
| 4,575,118 A | | 3/1986 | Matsui et al. |
| 4,611,854 A | | 9/1986 | Pfeiffer |
| 4,802,266 A | * | 2/1989 | Doty ................. A44B 11/2523 |
| | | | 24/637 |
| 4,915,451 A | * | 4/1990 | Forget ................... B60R 22/22 |
| | | | 24/115 A |
| 5,188,425 A | | 2/1993 | Foster et al. |
| 5,671,948 A | | 9/1997 | Susko et al. |
| 6,336,261 B1 | | 1/2002 | Yamamoto |
| 6,615,461 B2 | | 9/2003 | Suyama |
| 7,445,244 B2 | | 11/2008 | Taylor |
| 7,878,547 B2 | | 2/2011 | Dusina et al. |
| 8,851,522 B1 | | 10/2014 | Srugis et al. |
| 9,707,927 B1 | | 7/2017 | Boughner et al. |
| 2007/0138782 A1 | | 6/2007 | Murthy et al. |
| 2017/0006973 A1 | | 1/2017 | Boughner et al. |

FOREIGN PATENT DOCUMENTS

| | | |
|---|---|---|
| EP | 0 088 489 | 9/1983 |
| JP | 2009/6776 | 1/2009 |
| JP | 2010-260368 | 11/2010 |

* cited by examiner

BELT BUCKLE HAVING A FASTENING DEVICE FOR A CABLE

CROSS REFERENCE TO RELATED APPLICATIONS

This application claims priority to German Patent Application No. 10 2014 102 568.7, filed on Feb. 27, 2014 and PCT/EP2015/053885, filed on Feb. 25, 2015.

FIELD OF THE INVENTION

The invention relates to a belt buckle for a seat-belt system with a spring-loaded locking mechanism for locking a belt tongue that is pushed into a lock housing, and with a push button displaceably guided under spring action on the housing, for applying the pressure required to unlock the belt buckle. A cable fixing the belt buckle to a vehicle is fixed to the lock housing by a fixing device riveted to the lock housing, and the fixing device includes a plate-shaped base body having a base area from which a contact projection with a radially arcuate contact surface for a loop formed by the cable projects in an axial direction, and wherein a riveting pin projects from the contact projection in the axial direction.

BACKGROUND

From U.S. Pat. No. 4,454,634, for example, a belt buckle is known that has a locking mechanism that is spring-loaded when the belt tongue is not pushed in the opening direction, and when the belt tongue is pushed in the locking position. In the locked position of the locking mechanism, a locking bar is held in engagement with the belt tongue by means of a locking pin. The locking pin is in turn guided inside a lock housing in an L-shaped slotted guide and can be moved by means of an actuating button guided on the lock housing.

The belt buckle is fixed to a vehicle by a cable. The cable is guided inside the belt buckle as a loop. The loop lies on a contact surface of a contact projection of a fixing device. The fixing device includes a plate-shaped base body from which the contact projection projects in an axial direction, from which base body, in turn, a riveting pin projects. The fixing device is fixed to the lock housing by means of the riveting pin that passes through the lock housing.

There are continued efforts to reduce the dimensions of a belt buckle in the displacement direction of the push button without neglecting the stability and safety requirements for the belt buckle.

On this basis, the object of the present invention is to at least partially solve the problems described with reference to the state of the art, and in particular to provide a belt buckle having smaller dimensions in the displacement direction of the push button.

SUMMARY AND INTRODUCTORY DESCRIPTION

These above-mentioned objects are achieved with a belt buckle with the features of the present invention. Advantageous embodiments of the belt buckle are provided in the description, it being possible to use the features of the preferred embodiments in any combination in a technologically feasible manner.

The objects of the present invention are achieved, in particular, in that the riveting pin is eccentrically offset to an apex of the arcuate contact surface of the contact projection around which the cable is looped, whereby the distance of the apex of the contact surface from the center of the riveting pin is smaller than the radius of curvature of the contact surface on the apex.

The locking mechanism includes in particular one or a number of springs, a locking bar pivotably mounted on the lock housing that fixes the belt tongue in the locking position, a locking pin that secures the locking bar in the locking position, as well as a spring-loaded lever that engages with the locking pin. In addition, there is an ejector that engages with the belt tongue. The lever is, in particular, pivotably mounted on the ejector actuated by the lock tongue in such way that the spring acting on the lever can load the lever in an unlocking or locking process from a neutral position to either the locking position or the unlocking position. Here the lever is arranged such that it holds the locking pin in the locking position such that the locking pin fixes the locking bar in the locking position. Regarding more detailed functioning of the locking mechanism, see U.S. Pat. No. 4,454,634, to which full reference is made here concerning the functioning of the elements of the locking mechanism. In this context, the applicant's DE 10 2008 022 675 B3 is also cited, to which full reference is made regarding the functioning of the locking mechanism.

The plate-shaped base body of the fixing device extends in particular in a longitudinal direction, in a transverse direction orthogonal to the longitudinal direction, and in an axial direction orthogonal to the longitudinal direction and transverse direction, wherein the plate-shaped base body in particular has a smaller dimension in the axial direction than in the longitudinal and transverse direction. A contact projection now projects in the axial direction from the base area, spanned in the longitudinal and transverse direction of the base body. Radially to the axial direction, the contact projection has a contact surface on which an inner side of a loop formed by the cable abuts, whereby the cable can abut in the axial direction on the base surface. Here the point on the contact surface where the middle of the cable section abutting the contact surface abuts is understood to be the apex. In turn, a riveting pin that is riveted to the lock housing projects from the contact projection in the axial direction. The riveting pin has, in particular, a circular cross section, whereby the radius of the cross section is smaller than the radius of a cross section of the contact projection. Here, and below, a cross section is understood as a section transverse to the axial direction.

According to the present invention, the riveting pin is radially offset toward the contact surface around which the cable is looped, in particular radially offset toward the apex. In an extreme case, a radially circumferential surface of the riveting pin could be flush with the contact surface. The center of the riveting pin is in particular the center of the circular cross section of the riveting pin. The term "radius of curvature of the contact surface on the apex" means that the radius of curvature of the contact surface is determined at the point at which the center of the cable abutting the contact surface abuts. This kind of dimensioning of the distance requires, in particular, that the riveting pin is offset toward the contact surface.

By means of this eccentric offset of the riveting pin toward the contact surface, it is now achieved that with the same riveting point on the lock housing, the cable is offset toward the end of the belt buckle opposite the push button, so that starting from the riveting pin in the direction of the push button, there is more space for the other components of the belt buckle, or that in this direction, the belt buckle can be made shorter.

According to an advantageous embodiment of the belt buckle, the contact surface of the contact projection describes a circular arc. A cross section of the contact projection transverse to the axial direction is thus a circular arc in the region of the abutting cable. In this case, the loop of the cable would essentially abut the contact surface in a semicircle, wherein the cable in this semicircle would have the same radius of curvature everywhere.

Alternatively, it can be provided that the contact surface describes an elliptical arc. In this case, the curvature of the contact surface would vary along the loop. The apex of the cable loop would thus in particular abut the apex of the elliptical arc. The radius of curvature relevant for the measurement of the distance would therefore then be the radius of curvature of the ellipse at the apex. With such a design, the radius of curvature of the contact surface at the apex would be larger than at the other points on the contact surface.

According to an additional embodiment of the belt buckle according to this invention, it is provided that at least one cable mounting bracket is configured on the fixing device, the cable mounting bracket being arranged at a distance corresponding to at least the cable diameter from the contact surface, and opposite to the same. The cable mounting bracket projects in particular in the axial direction from the base body. The cable mounting bracket allows insertion of the loop of the cable between the cable mounting bracket and the contact surface, so that the loop is fixed between the cable mounting bracket and the contact surface. This has the advantage that when assembling the belt buckle, the fixing device with the preassembled loop of the cable can be inserted into the belt buckle.

In order for the fixing device to have a relatively low weight, it is provided that the base body has a rectangular basic form, and a longitudinal side of the base body is flush with an area of the contact surface, in particular with the apex, of the contact projection. This means, in particular, that the base body does not project to all sides over the contact surface.

According to a further embodiment, the fixing device is formed as one piece, which allows simple and cost-efficient manufacture of the fixing device.

It is also provided that in order to avoid assembly errors, a recess is formed in the base body. A projection corresponding to the recess is formed in the belt buckle, on which recess the base body rests when the fixing device is correctly aligned during assembly, whereas with wrong alignment of the fixing device, another area of the fixing device would rest on the projection, whereupon the wrong alignment would become obvious.

BRIEF DESCRIPTION OF THE DRAWINGS

The invention as well as the technical environment will be explained below with reference to the figures, wherein it should be noted that the figures show advantageous embodiments of the invention, but the invention is not limited to them.

DETAILED DESCRIPTION

Figure 1:
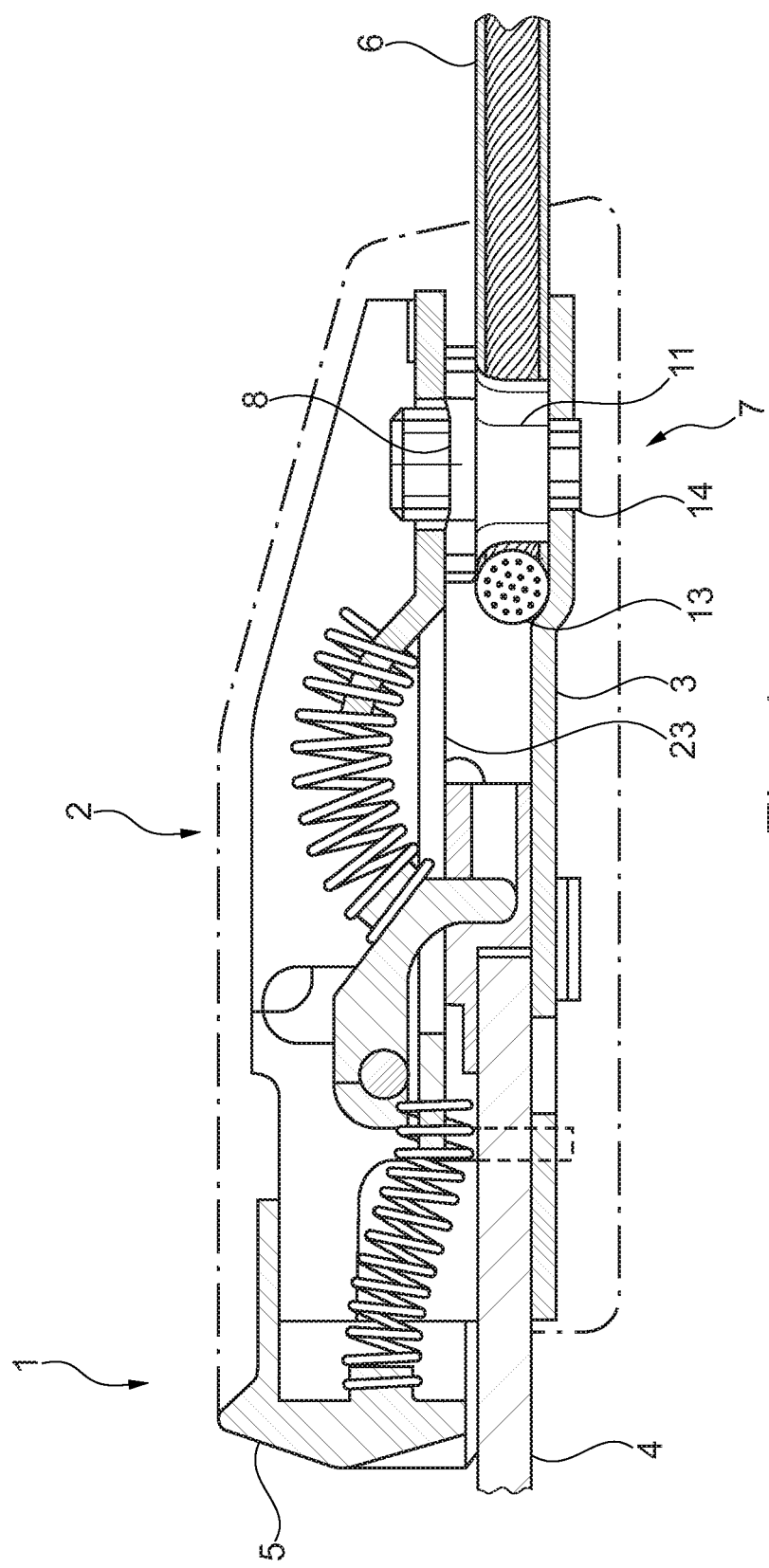
FIG. 1 shows a belt buckle from the state of the art with a fixing device.

FIG. 1 shows a belt buckle 1 from the state of the art with a lock housing 3 in which a locking mechanism 2 having a locking bar 23 is arranged. In a locking position of the belt buckle 1, a belt tongue 4 is fixed in the lock housing 3 by the locking bar 23. By actuating a push button 5 that is displaceably mounted on the lock housing 3, the locking mechanism 2 is actuated, so that the belt tongue 4 is released. The exact functioning of the locking mechanism 2 is thoroughly described in the state of the art and is not significant for the present invention.

The belt buckle 1 is fixed to the vehicle by means of a cable 6. The cable 6 is guided inside the lock housing 3 as a loop 13 and is riveted by means of a fixing device 7 by a riveting pin 14 of the fixing device to the lock housing 3. The fixing device 7, as well as the cable 6 engaging therewith, is described in more detail in the following exemplary embodiments.

Figure 2:
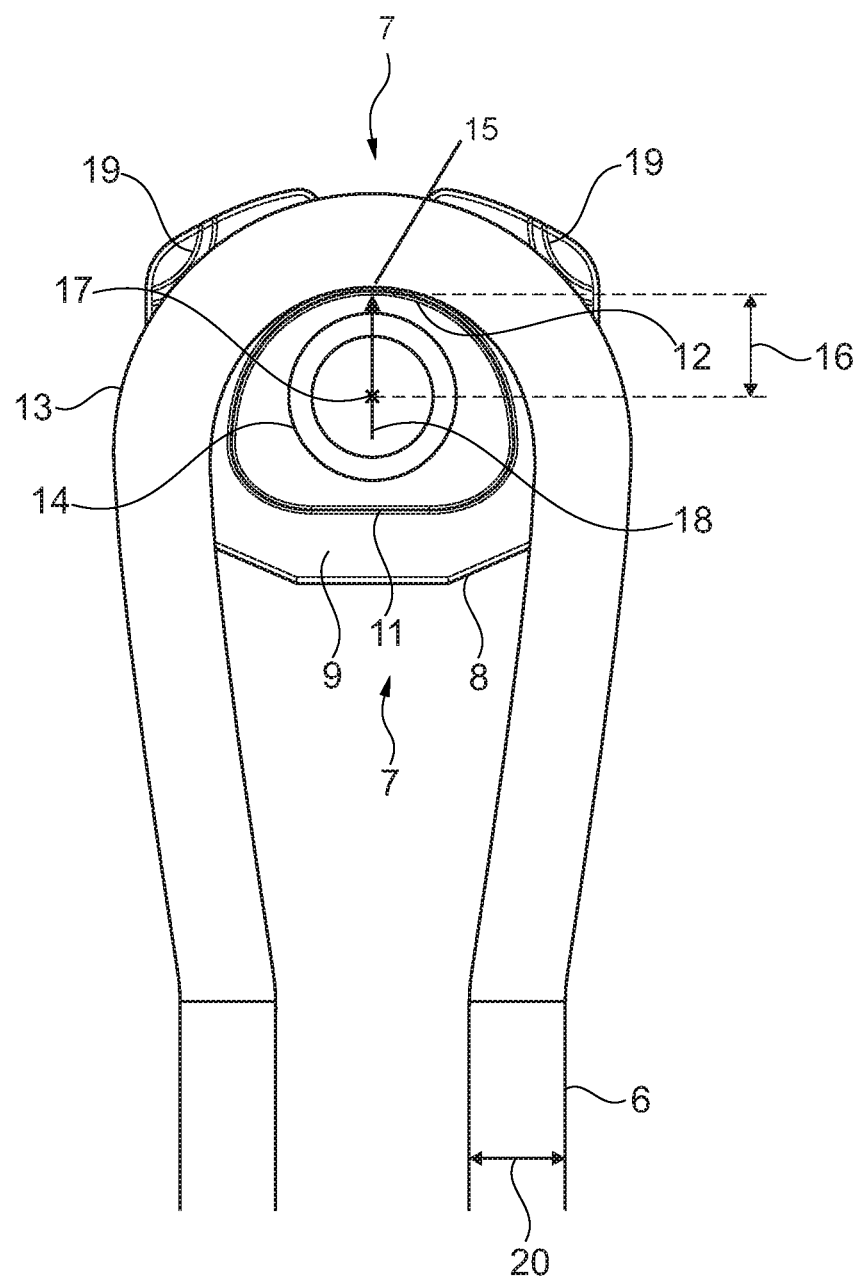
FIG. 2 shows a first embodiment of a fixing device on a cable.
Figure 3:
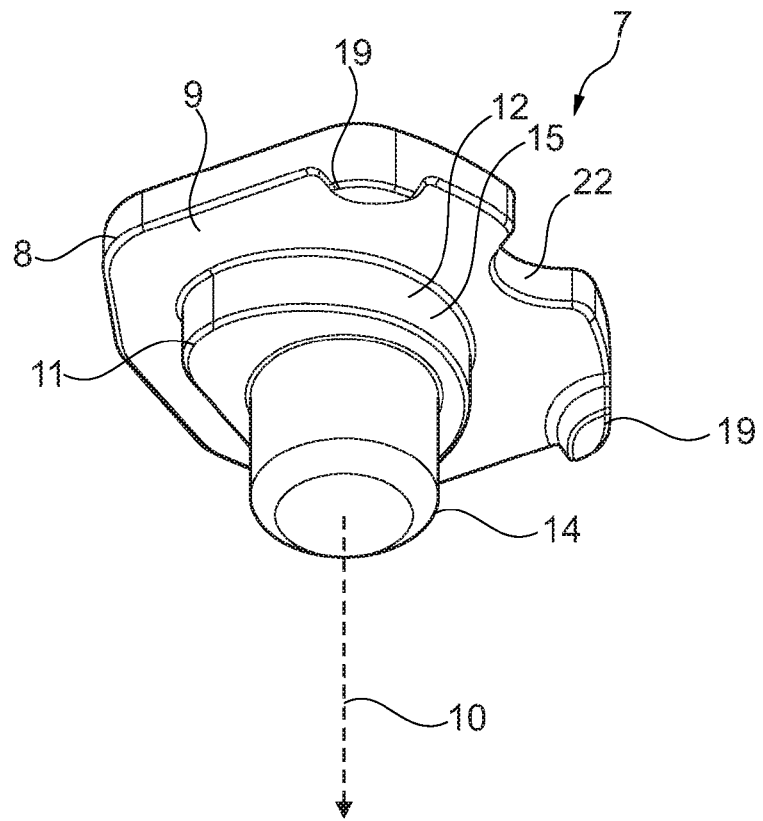
FIG. 3 shows the fixing device from FIG. 2 in a perspective view.

A first embodiment of a fixing device 7 is shown in the FIGS. 2 and 3, whereby in FIG. 2 a cable 6 having a cable diameter 20 is also shown. The fixing device 7 includes a base body 8 having a base surface 9 from which a contact projection 11 projects in an axial direction 10. The contact projection 11 has on its circumference a radial arcuate contact surface 12 against which an inner side of a loop 13 formed by the cable 6 abuts. In turn, from the contact projection 11, a rivet pin 14 projects in the axial direction 10, by which the fixing device 7 is riveted to the lock housing 3. According to the present invention, the pin 14, with a center 17, is now eccentrically offset toward an apex 15 of the contact surface 12. The apex is here defined as the point at which the center of the cable section abutting the contact surface 12 abuts. The distance 16 of the center 17 of the pin 14 to the apex 15 is thus smaller than a radius of curvature 18 of the contact surface 12 at the apex 15. Because in this embodiment the contact surface 12 has an arcuate cross section, the radius of curvature 18 at the apex 15 corresponds to the radius of the circular arc.

In addition, two cable mounting brackets 19 extending in the axial direction 10 are formed on the base body 8. The distance between the cable mounting brackets 19 and the contact surface 12 is such that the cable 6 is fixed between the contact surface 12 and the cable mounting brackets. Furthermore, a recess 22 that prevents assembly errors is configured in the base body 8.

Figure 4:
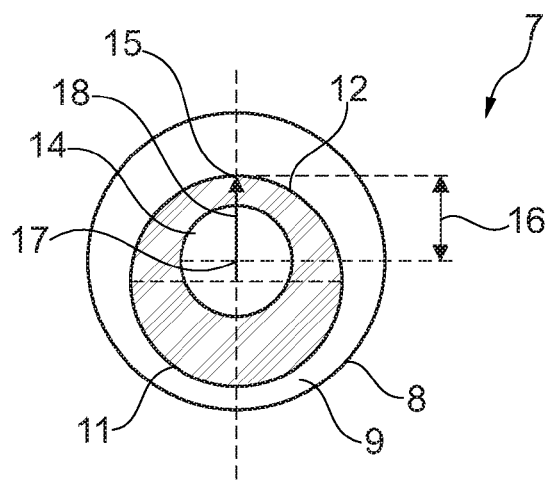
FIG. 4 is a top view of a second embodiment of a fixing device.

FIG. 4 describes a second embodiment of a fixing device 7, whereby here particular attention is given to the differences compared with the first embodiment. The fixing device 7 has a base body 8 with a circular cross sectional area. A contact projection 11 that also has a circular cross sectional surface projects from a base area 9 of the base body 8. A riveting pin 14 projects in turn from the contact projection 11. It can be seen that the pin 14, with its center 17, is radially offset toward the center of the circular cross sectional surface of the contact projection 11. The distance 16 between the center 17 of the riveting pin 14 and the apex 15 of the contact surface 12 is thus smaller than the radius of curvature 18 of the contact surface 12 at the apex 16.

Figure 5:
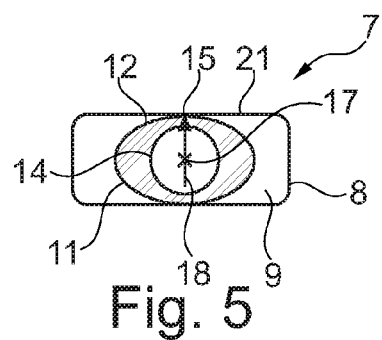
FIG. 5 shows a third embodiment of the fixing device.

FIG. 5 shows a third embodiment of a fixing device 7. The fixing device 7 includes a rectangular plate-shaped base body 8, a contact projection 11 that is elliptically shaped in cross section projecting from its base area 9. The contact projection 11 has a contact surface 12. The contact surface 12 is flush with the apex 15 of a longitudinal side 21 of the rectangular base body 8. A pin 14 projects from the contact projection 11; the center 17 of the pin is axially offset toward the apex 15 of the contact surface 12 of the contact projection 11. The radius of curvature 18 of the contact surface 12 in the apex 15 is larger than the distance from the center 17 of the pin 14 to the apex 15 of the contact surface 12.

Figure 6:
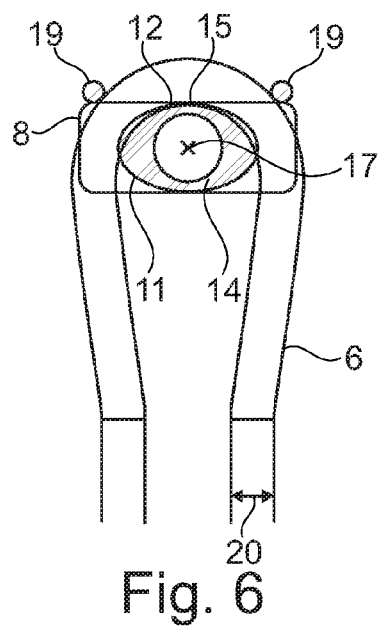
FIG. 6 shows a fourth embodiment of the fixing device.
Figure 7:
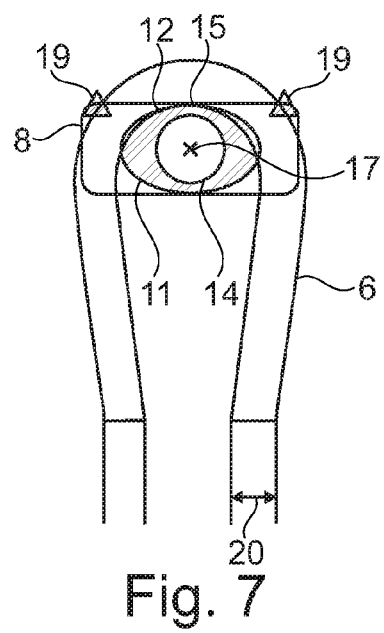
FIG. 7 shows a fifth embodiment of a fixing device.

Two embodiments of a fixing device 7 are shown in the FIGS. 6 and 7, in which these embodiments differ from the third embodiment in FIG. 5 in the design of the cable mounting brackets 19. The cable mounting brackets 19 are arranged at a distance from the elliptically shaped contact surfaces 12 of the contact projection 11 such that the cables 6 that are shown, with the cable diameters 20, are fixed between the cable mounting brackets 19 and the contact surfaces 12. With the embodiment in FIG. 6, the cable mounting brackets 19 have a circular cross section, whereas with the embodiment in FIG. 7, the cable mounting brackets 19 have a triangular cross section.

With the present invention, due to the radically eccentric offset of the pin 14 in the direction of the apex 15 of the contact surface 12, belt buckles 1 can be made with a smaller extension in the displacement direction of the push-bottom.

While the above description constitutes the preferred embodiment of the present invention, it will be appreciated that the invention is susceptible to modification, variation and change without departing from the proper scope and fair meaning of the accompanying claims.

The invention claimed is:

1. A belt buckle for a seat belt system having a cable which attaches the belt buckle to a vehicle, the belt buckle comprising a spring-loaded latch mechanism for latching a belt tongue inserted into a buckle housing, a push button that is disposed on the buckle housing and can be displaced for unlatching the belt buckle, a fastening device affixed to the buckle housing, the fastening device includes a base body, an abutment projection which protrudes in a axial direction from a surface of the base body and has an arcurate abutment surface for a loop formed by the cable, and a pin extends in the axial direction from the abutment projection, the pin is oriented relative to an apex of the arcurate abutment surface of the abutment projection, around which the cable wraps, wherein a distance of the apex of the abutment surface to a center point of the pin is less than a radius of curvature of the abutment surface at the apex.

2. The belt buckle in accordance with claim 1, wherein the abutment surface in the form of a circular arc.

3. The belt buckle in accordance with claim 1, wherein the abutment surface in the form of an arc of an ellipse.

4. The belt buckle in accordance with claim 1, wherein at least one cable bracket is formed on the fastening device, wherein the cable bracket is disposed opposite the abutment surface at a distance of at least a diameter of the cable.

5. The belt buckle in accordance with claim 1, wherein the base body has a generally rectangular shape and a longitudinal side of the base body aligns with a region of the abutment surface of the abutment projection.

6. The belt buckle in accordance with claim 1, wherein the fastening device is formed as one part.

7. The belt buckle in accordance with claim 1, wherein a recess is disposed in the base body, wherein the recess is configured for obviating mounting errors.

8. The belt buckle in accordance with claim 1, further comprising a pair of brackets extending from the surface of the base body for engaging the cable and maintaining the cable against the arcuate abutment surface.

9. The belt buckle in accordance with claim 1, wherein the pin has a circular cross-section having a radius of curvature wherein the radius of curvature of the abutment surface is greater than the radius of curvature of the pin.

* * * * *